United States Patent [19]
Yevick

[11] 4,154,515
[45] May 15, 1979

[54] MULTIPLE FUNCTION MICROFICHE AND FILM RECORDING AND VIEWING SYSTEM

[75] Inventor: George J. Yevick, Leonia, N.J.

[73] Assignee: Izon Corporation, Stamford, Conn.

[21] Appl. No.: 594,364

[22] Filed: Jul. 9, 1975

Related U.S. Application Data

[62] Division of Ser. No. 474,790, May 30, 1974, Pat. No. 3,967,289.

[51] Int. Cl.² .................. G03B 21/14; G03B 23/08
[52] U.S. Cl. .................................. 353/38; 353/25
[58] Field of Search ............. 353/27 R, 27 A, 38, 353/32, 122, 84, 81, 25; 354/115, 125; 350/96 BC; 355/1

[56] References Cited

U.S. PATENT DOCUMENTS

| | | | |
|---|---|---|---|
| 1,987,443 | 1/1935 | Ives | 353/38 |
| 2,451,902 | 10/1948 | Bassani | 353/32 |
| 3,020,806 | 2/1962 | Castrucci | 350/96 BC |
| 3,043,179 | 7/1962 | Dunn | 355/1 |
| 3,338,131 | 8/1967 | Klein | 353/38 |
| 3,360,670 | 12/1967 | Manning | 350/96 BC |
| 3,712,724 | 1/1973 | Courtney-Pratt | 353/38 |
| 3,768,898 | 10/1973 | Yost | 353/84 |
| 3,825,336 | 7/1974 | Reynolds | 355/1 |

*Primary Examiner*—Harry N. Haroian
*Attorney, Agent, or Firm*—Thomas J. Greer, Jr.; Daniel M. Rosen

[57] ABSTRACT

A combined microfiche camera and projection apparatus. The apparatus includes an objective lens for forming a real image on the input end of a coherent bundle of light fibers (internally reflecting glass fibers). The output end of the bundle is dispersed into a plurality of spaced-apart coherent fiber sub-bundles. The ends of the latter terminate contiguous to the emulsion of a microfiche. A projection screen is spaced from the microfiche. The device functions both to record and to read out.

12 Claims, 8 Drawing Figures

MULTIPLE FUNCTION MICROFICHE AND FILM RECORDING AND VIEWING SYSTEM

This is a division, of application Ser. No. 474,790, filed May 30, 1974, now U.S. Pat. No. 3,967,289.

This invention relates to a microfiche apparatus exhibiting utility both as a recording device (a camera) and as a readout device (a projector). In my co-pending United States application Ser. No. 309,968, now U.S. Pat. No. 3,864,034 filed Nov. 28, 1972, entitled MICROFICHE AND READER, I have disclosed a microfiche device wherein the microfiche includes a plurality of integral lensettes. Also, in my co-pending United States patent application Ser. No. 427,355, filed Dec. 21, 1973, and entitled FIBER OPTIC SYSTEM, I have disclosed a system which employs a bundle of internally reflecting glass fiber elements for the purpose of magnifying an object. In this latter disclosure, one end of the bundle is compact and receives a real image. The other end of the bundle is dispersed into a plurality of sub-bundles whose termini are spaced from each other. The termini of the spaced sub-bundles is adapted to project an image onto a screen, the screen being contiguous to the termini.

According to the practice of the present invention, I provide an apparatus which combines several features of these two disclosures. According to the practice of the invention, a combination of a dispersed coherent fiber sub-bundle ensemble is combined with a lensfiche which carries its own lensettes or other optically active elements. By virtue of the present construction, it is possible to both record and to project utilizing substantially a single apparatus only.

IN THE DRAWINGS

Figure 1:
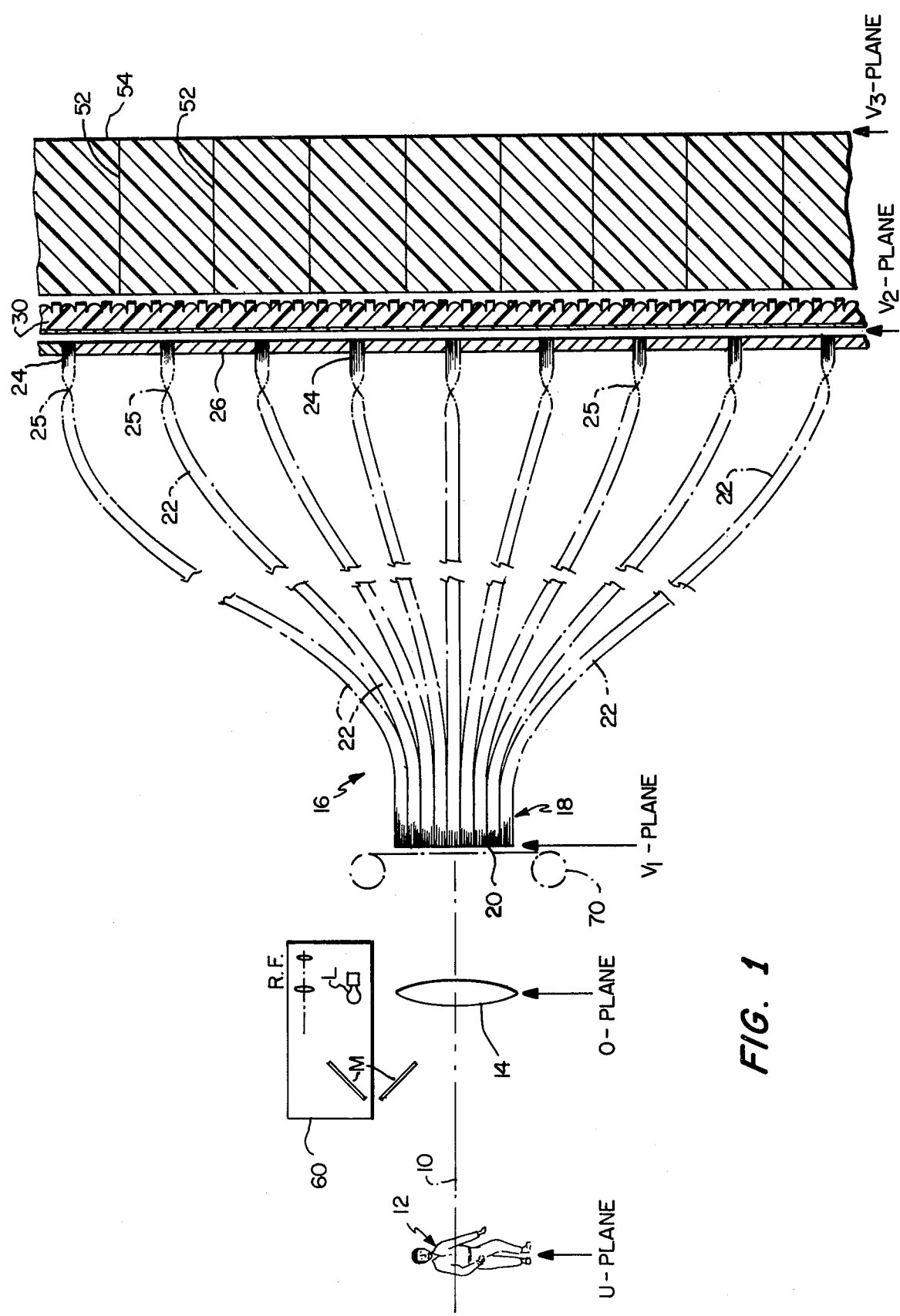
FIG. 1 is a partially schematic view illustrating the invention.

Referring now to FIG. 1 of the drawings, the numeral 10 denotes the optic axis of the combined camera and projector of this invention. The numeral 12 schematically denotes an object which may be a person, a printed page, a landscape, etc. The numeral 14 denotes an objective lens and the numeral 16 denotes a bundle of coherent fiber optic elements. The input end of the bundle is denoted by the numeral 18 and the individual elements, as in the manner of fascine, are closely packed and terminate in input face 20. The elements of the bundle 18 preferably assume the form of internally reflecting glass fibers coated with a cladding, all in a manner well known to workers in the optic arts. The numeral 22 denotes any one of a plurality of sub-bundles, the sum of which defines bundle 18, whose termini 24 are spaced apart from each other. The termini 24 are positioned on and define a surface. A 180° twist in each sub-bundle 22 is provided to compensate for image inversion in each coherent light guide sub-bundle 22. It will be understood that instead of a coherent light guide defined by a plurality of totally internally reflecting fiber optic devices, a device marketed under the tradename Selfoc, as described in U.S. Pat. No. 3,658,407, may be employed.

A microfiche denoted by the numeral 30 having emulsion 32 (see FIG. 2) is positioned adjacent and contiguous to the termini 24. As described in my co-pending application Ser. No. 309,968, the microfiche may be formed of a clear plastic such as methylmethyacrylate, with emulsion 32 on one side thereof and on the other side a plurality of integral lensettes 34 spaced from each other by opaque portions 36. In a typical example, the lensettes 34 are positioned in rows and columns completely across the face of the microfiche 30, with, for example, interlensette spacing on the order of 7 mils. A viewing screen 50, also formed of a clear plastic such as methylmethyacrylate, is provided on its surface adjacent the microfiche 30 with opaque portions 38 (see FIG. 2) between which are defined openings 40. The openings 40 and opaque portions 38 may be considered as defining a coarse selector mask for the purpose of inhibiting cross-talk in both the projection and the reading operation. The openings 40 allow light to pass through a selected set of lensettes only. The openings 40 form a grid and each opening is, typically, 7 mils in diameter and positioned approximately 100 mils apart completely covering the rear face of the screen 50. The screen is also provided with opaque septa 52, at right angles to the screen's plane, the septa crossing each other so as to define one rectangular cell having opaque sides for each opening 40. The cells open on the other side of viewing surface 54 of the screen 50. The purpose of the septa is to inhibit cross-talk in both the taking and the viewing stage. In the recording phase, septa 52 function as field stops. At FIG. 2, the bundle end 20 is shown as defining a Petzval surface, such surface being optional.

The numeral 60 of FIG. 1 schematically designates auxiliary equipment of conventional nature which may be employed on the above-described apparatus. Mirrors M are adapted to be positioned into the optic axis 10 for projection of light fron a source L onto the bundle end 20 for a purpose which will presently be described. Similarly, the designation R.F. schematically denotes a range finder, again of conventional construction, which may be employed in the usual manner with the apparatus for the taking stage.

Figure 2:
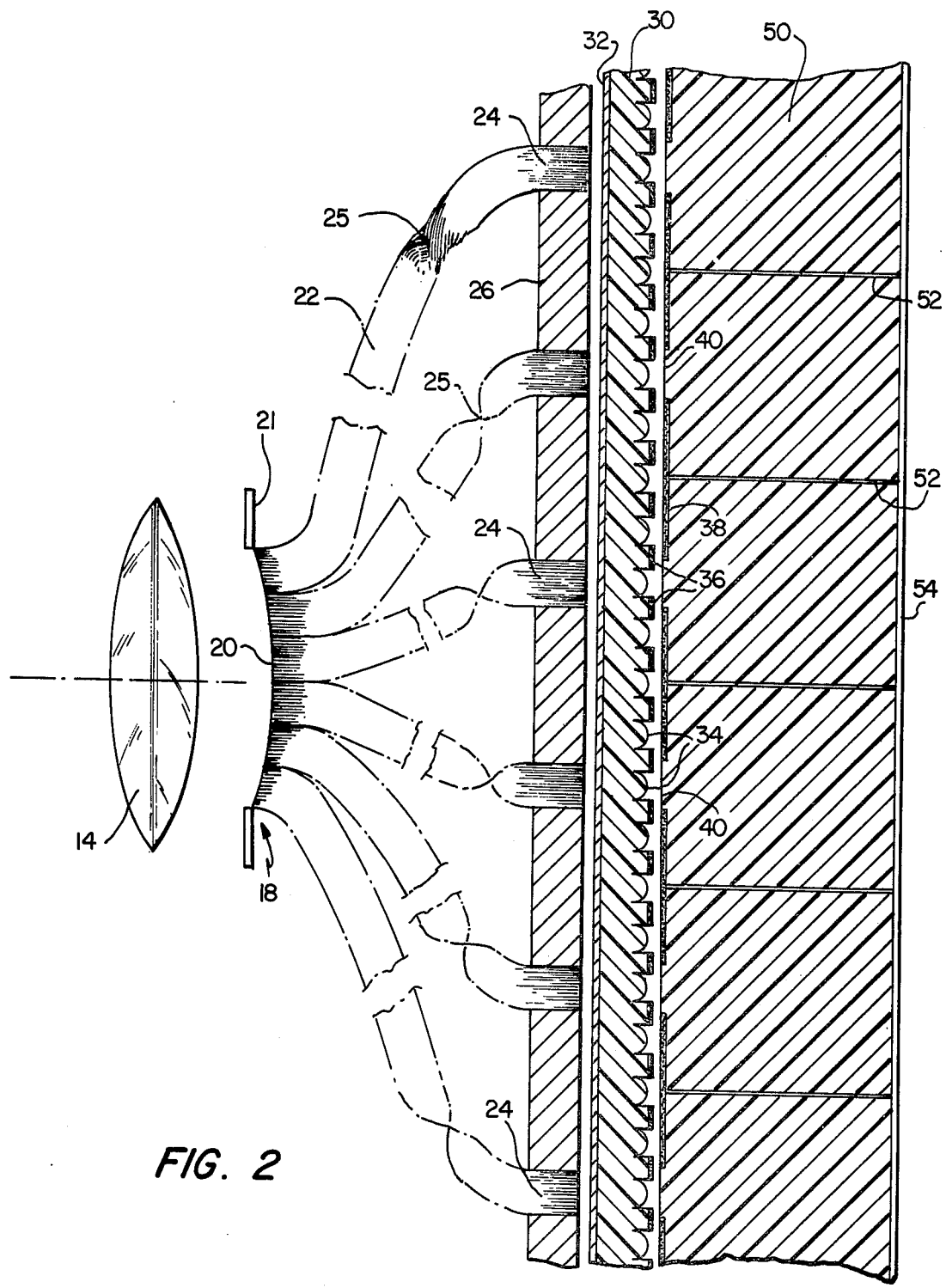
FIG. 2 is a view similar to FIG. 1, on an enlarged scale, and illustrates in greater detail the lensfiche and screen construction in cooperation with the termini of the sub-bundle.

The operation of the device illustrated at FIGS. 1 and 2 is as follows. An object denoted by the numeral 12 is seen by objective lens 14, the objective forming a real image of subject 12 at end 20 of bundle 18. The range finder R.F. may be employed for this purpose. For convenience in description, the object is said to be at a U-plane, the objective lens 14 at the O-plane, and the end 20 at the $V_1$-plane. The real image is dispersed amongst the various sub-bundles 22, with sub-images appearing at the output terminai 24. As may be seen by reference to FIG. 2, the microfiche 30 is positioned relative to termini 24 such that each terminal is adjacent and optically aligned with a single lensette 34. The photographic emulsion 32 is thus activated or exposed, this defining a complete taking step. The microfiche 30 is now indexed one inter-lensette distance either horizontally, vertically, or diagonally, thus aligning a different and distinct set of lensettes 34 (with corresponding emulsion areas) with termini 24. The shutter (not illustrated) of the camera is now opened and another recording of an object on the U-plane is made in the same manner. Thereafter, the microfiche 30 is again indexed to thereby align a third, distinct set of lensettes 34 with termini 24, and hence with corresponding fresh emulsion portions. This process continues until each of the distinct sub-sets of lensettes 34, with corresponding emulsion portions, is exhausted. It will be plain that the final set of images appears at a $V_2$-plane which corresponds with the physical plane of photographic emulsion 32. Microfiche 30 is now removed from the apparatus and emulsion 32 fixed or developed. Alternatively, the emulsion may be developed and fixed in situ by known processes such as those practiced in Polaroid brand cameras.

For readout, the microfiche 30 is reinserted into the apparatus and lamp L and/or mirror M moved so as to direct light onto the end 20 of bundle 18. The illumination from source L is broken up in an obvious manner, with each terminal 24 now serving to illuminate a corresponding and distinct sub-area of the developed emulsion (corresponding to a distinct set of lensettes 34). The micro images fixed on emulsion 32, for the first recorded scene, are now projected through lensettes 34, the final and reconstructed image appearing on viewing surface 54, located at a $V_3$-plane. In order to read out the next scene, the microfiche 30 is indexed one inter-lensette distance so that a second and distinct set of lensettes 34, with their corresponding developed emulsion portions, are optically aligned with termini 24. Again, the scene is viewed at viewing surface 54. This process continues until each of the distinct sub-sets of lensettes 34 at corresponding emulsion portions have been exhausted. It will be understood that any specific illumination arrangement, other than that indicated schematically by the numeral 60 and L and M may be employed.

Figure 3:
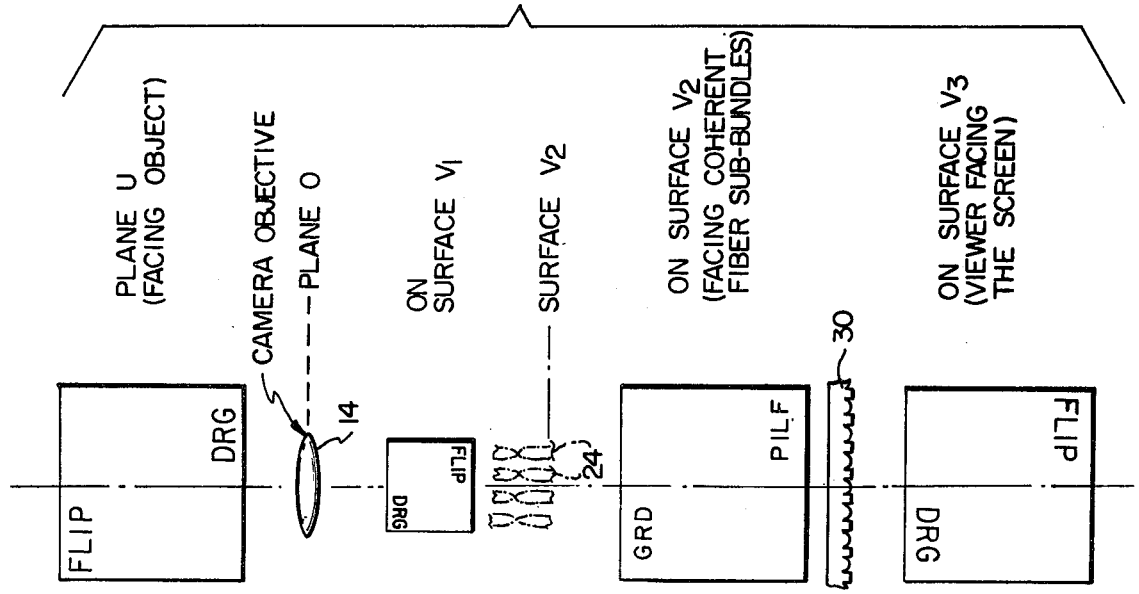
FIG. 3 is a schematic view illustrating the optical inversions and gross size changes of an object in passing through the several optical planes of FIG. 1.

Referring now to FIG. 3 of the drawings, a schematic designation is given as to how the object changes and how it would appear at the various planes of FIG. 1. At the top of FIG. 3, an object, here in the form of a card with printed indicia, is illustrated as in the object plane U. Light from the object is transmitted through objective 14 at plane O and it appears on plane $V_1$ as inverted. At plane $V_2$ the meshing images from termini 24 appear indicated. Finally, the projection at $V_3$ is indicated and it is seen that an enlargement has taken place due to the projection from the lensettes 34.

Again, referring to FIG. 1 of the drawings, the versatility of the apparatus will become more apparent in view of the following. Instead of employing a microfiche 30 of the type described, spools 70 carrying conventional photographic film may be placed at plane $V_1$, together with a conventional shutter mechanism (not illustrated) for taking motion pictures. In this mode of operation, the apparatus functions conventionally, with all apparatus to the right of the film 70 (at plane $V_1$) not involved in the recording. After chemical development of the motion picture film, the film is replaced in the apparatus, the source of illumination L and the mirrors M moved as before described. The apparatus is now employed to project the film images onto viewing surface 54. In this mode, the microfiche 30 is required, with, however, only one set of lensettes employed.

In still another mode, unexposed film may also be placed at plane $V_1$ for the purpose of recording objects placed on viewing surface 54. In this mode, a microfiche 30 is employed with, however, no emulsion 32 beneath that set of lensettes aligned with termini 24.

In still another mode, it is also possible to place unexposed photographic film on viewing surface 54. In this mode, light passing through objective 14 from an object 12 passes through bundle 18, termini 24, microfiche 30, lensettes 34, and finally to the viewing surface. The reader wll now recognize that here an object may be located in any of the U, $V_1$, or $V_2$ planes. In yet another mode, unexposed film may be placed at both planes $V_1$ and $V_2$.

The various modes are set forth in the following table.

TABLE 1

| Surface Locations of Virgin Film | Surface Locations of Objects to be Recorded |
| --- | --- |
| $V_1$ | U, $V_2$ or $Y_3$ in any combination alone or together |
| $V_2$ | U, $V_1$ or $V_3$ in any combination alone or together |
| $V_3$ | U, $V_1$, or $V_2$ in any combination alone or together |
| $V_1$ and $V_2$ | U and $V_3$ alone or together |
| $V_1$ and $V_3$ | U and $V_1$ alone or together |
| $V_2$ and $V_3$ | U and $V_1$ alone or together |
| $V_1$, $V_3$ and $V_3$ | U alone |

A description will now be given of three embodiments which will permit the recording and viewing of information in color using black and white emulsion. Clearly, color film may be used, if desired, as virgin film in Table 1. It will thus be apparent that, for example, the viewing screen at location $V_3$ may be the situs of either virgin emulsion or master intelligence to be recorded or a viewing screen. Accordingly, the term screen as used in the claims is intended to embrace each of these applications.

Figure 4:
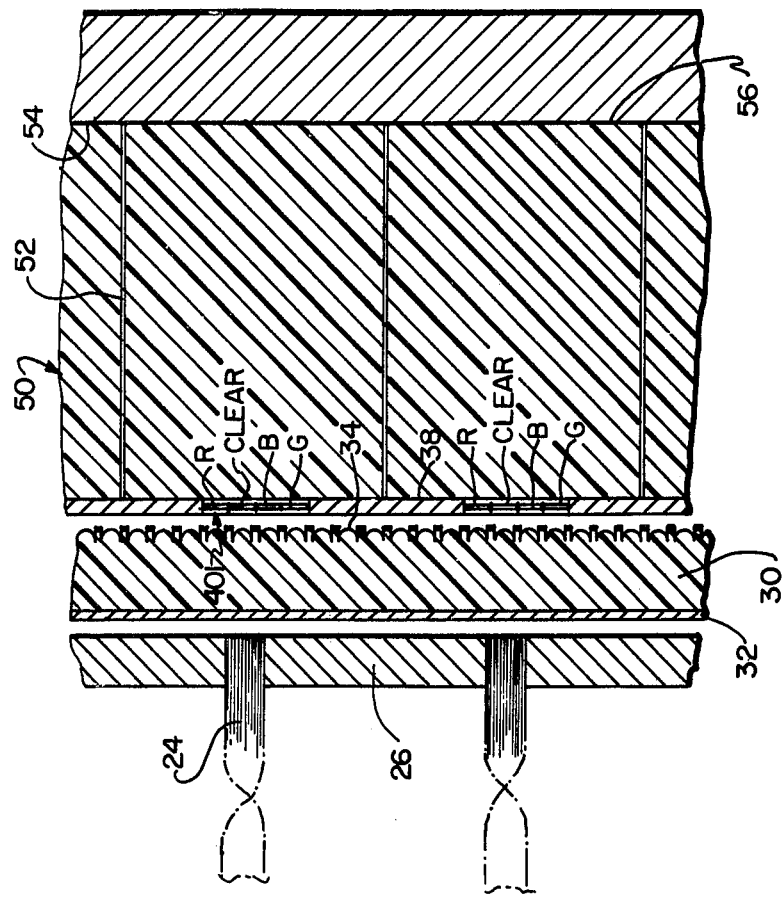
FIg. 4 is a partial cross-section illustrating an embodiment wherein color recording may be realized.
Figure 5:
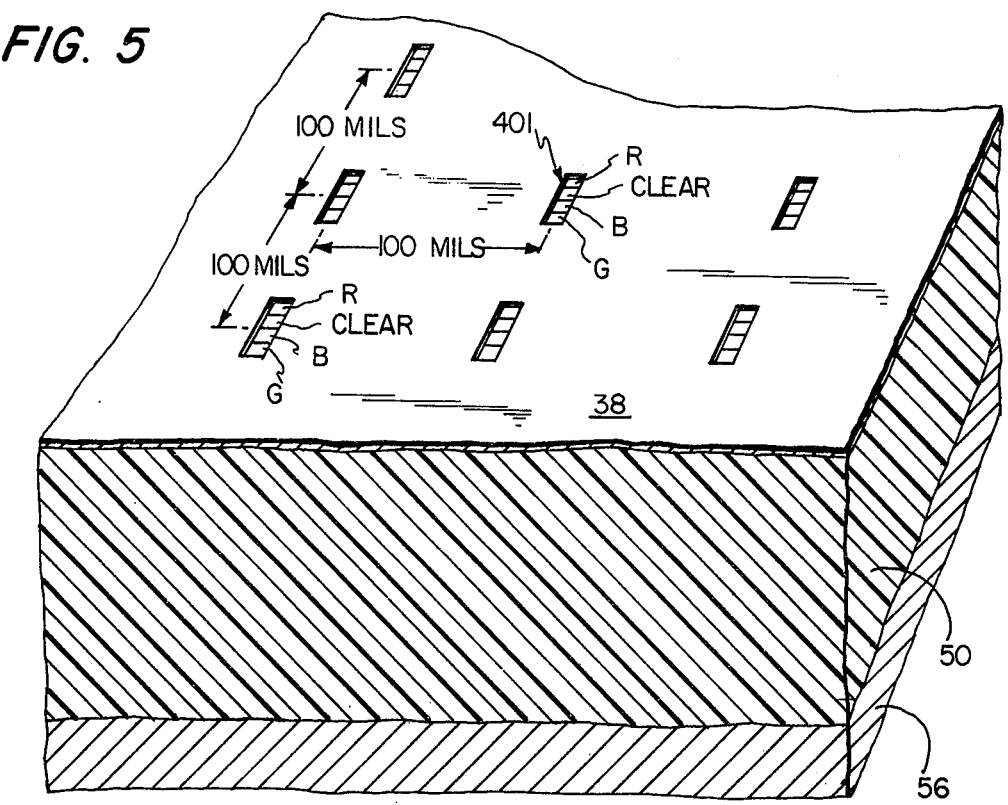
FIG. 5 is another view of the color recording system of FIG. 4.

Referring now to FIGS. 4 and 5 of the drawings, the numeral 24 again represents termini of coherent light fiber bundles 22 supported by plate 26 and against which microfiche 30 having photographic emulsion 32 is adapted to rest, all as has been previously described. A modification is made to the viewing screen 50. That face of the screen which carries opaque portions 38 and openings 40 is modified so that the openings 40 are larger, now denoted by the numeral 401. The openings include filters for the primary colors red, blue, green, and if desired for brillance, a clear space of the same size as the color filters. A mirror surface 56 is placed against viewing surface 54. As shown at FIG. 5, the filters and the clear portion of openings 401 are aligned, for the purpose of explanation, but may in practice occupy corners of a square. The operation of the device is as follows: Color from an object at the U-plane is transmitted through the apparatus in a manner as previously described. The colored light existing from termini 24 passes through the clear portion of openings 401. Each clear portion of opening 401 is optically aligned with a terminal 24. The portion of the object carried by each termini then impinges upon mirrored surface 56. There, it forms a real image at the end of each cell defined by opaque septa 52. This real image now serves as an object for the color filters red, blue, green. The emulsion immediately beneath and corresponding to each color filter, as well as that beneath the clear portion, is thus activated. A unique, distinct lensette 34 is optically aligned with each filter and the single clear element for each aperture 401. Thus, for each cell defined by opaque septa 52, there are four micro images on film 32 after development. Each micro image corresponds to one of the four apertures in opening 401. The same occurs at each of the other apertures 401 throughout the face of the microfiche 30, as may be readily visualized by reference to FIG. 5. The microfiche is now indexed, so as to align a different four-set of lensettes 34 with the four filter element, and the process repeated for a different scene.

In the readout or viewing mode, the emulsion is chemically developed and the microfiche reinserted. Plate 26 is now spaced by a clear sheet from emulsion 32 so that light existing from termini 24 diverges and now passes through the four micro images, with light from each micro image passing through its corresponding lensette 34. The mirror 56 is removed and the viewer sees the colored image on the viewing screen. The process is repeated for the next recorded scene by indexing so as to align a different set of four-set filters with termini 24. The reader will observe that the recorded micro images are in black and white.

Figure 6:
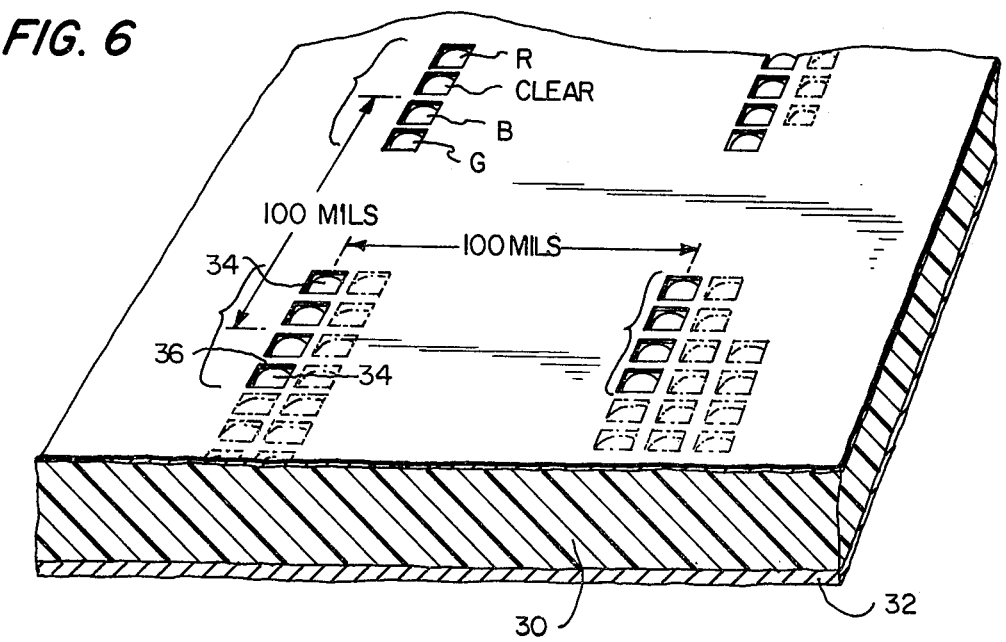
FIG. 6 is a view similar to that of FIG. 5, but illustrating still another embodiment.

Referring now to FIG. 6 of the drawings, a modification of the embodiment of FIG. 4 is disclosed where the only difference is that apertures 401 in opaque mask 38 with their color filters red, blue, green and clear are replaced by correspondingly tinted adjacent four-element sub-sets of lensettes 34 of a microfiche 30. The apertures 401 are now simply voids in opaque covering 38 and are of a surface extent to accommodate four lensettes. The operation is otherwise the same.

Figure 7:
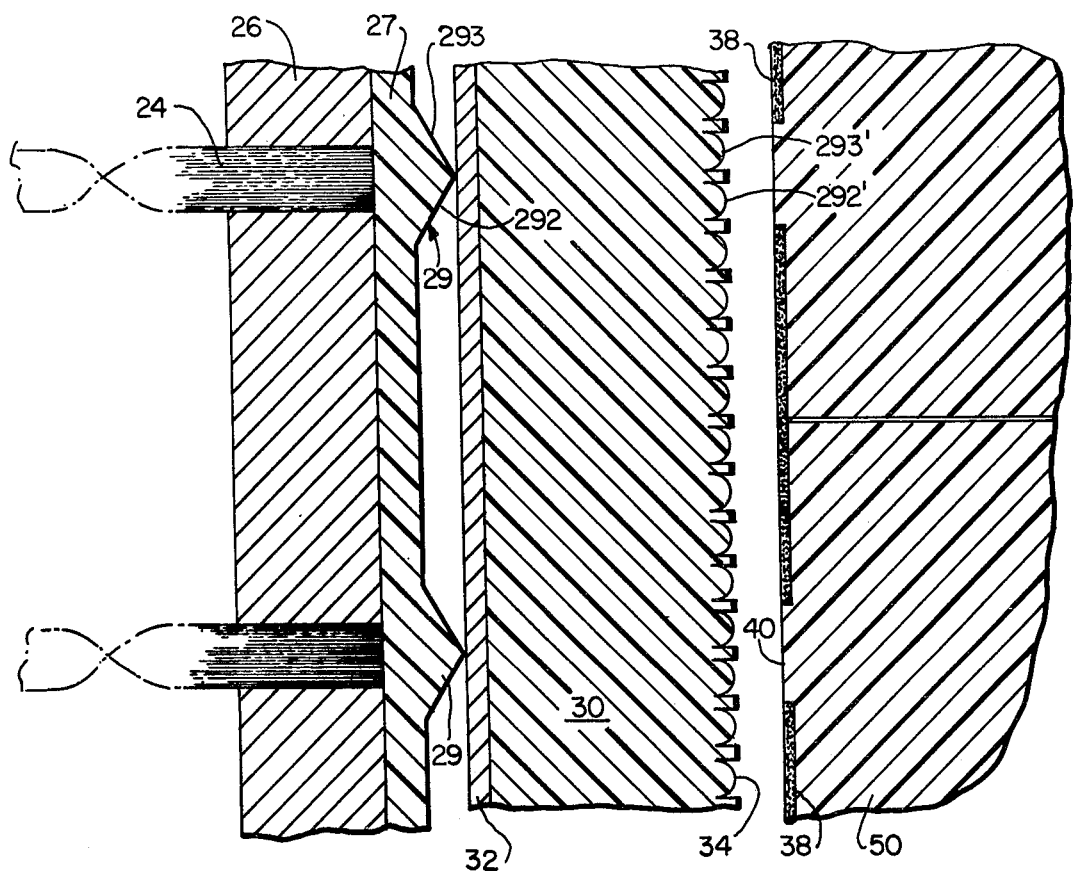
FIG. 7 is a view similar to that of FIG. 4, but illustrating yet another embodiment.
Figure 8:
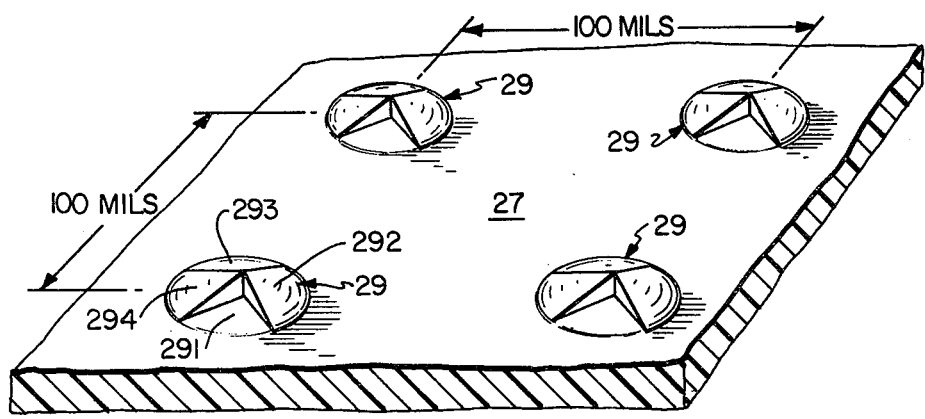
FIG. 8 is a perspective view of the plate 27 of FIG. 7.

Referring now to FIGS. 7 and 8 of the drawings, a third modification is illustrated wherein color capabilities of the apparatus may again be realized while employing only black and white film. The structural difference between the embodiment of FIGS. 7 and 8 and that illustrated at FIG. 2 of the drawings is the use of an insert member 27 of the same planar extent as that of microfiche 30. The element 27 is similarly a sheet formed of clear plastic such as methylmethacrylate and includes spaced nodules 29 on one face thereof. Each nodule may be considered as a four-sided pyramid. The apex of each pyramid coincides axially with a terminal 24, there being as many nodules 29 as there are termini 24, and vice versa. Each nodule is defined by four planar faces denoted by 291, 292, 293, 294. Three of the four faces are coated, respectively, with a primary color filter. Each face has a corresponding lensette 291', 292', 293', 294' associated therewith. When light defining an image exits from each terminal 24, the corresponding nodule generates four identical disjoint images on emulsion 32. As known to workers in the optic arts, light is bent when it exists at an angle to the normal from a transparent substance having an index of refraction greater than unity. Accordingly, the emulsion areas beneath corresponding lensettes 293', 294', 292', 291' are activated. Each face 291–294 is aligned with a different lensette 34, there being a square, four-group of lensettes for each nodule 29. As indicated at FIG. 7, two lensettes 293', 292' are aligned with two respective nodule faces 293, 292. The other two lensettes of the four-group extend towards the reader, out of the plane of the paper. For the next color scene, the lensfiche 30 is indexed so that a different sub-set of four element emulsion areas are exposed. The indexing operation is entirely analogous to that manner described with respect to FIG. 4.

At the conclusion of the process, the emulsion is fixed or developed. For readout, the plate 27 is left in place and the microfiche 30 indexed as in the embodiment of FIG. 4. Again, the reader will observe that color recording and readout are both realized using only black and white photographic film. Further, no color filters are required. The distance between the exit faces of termini 24 and the apex of each nodule 29, as well as the distance between the nodule apex and the emulsion 32, in order to have four identical, disjoint images of desired separation, may be easily calculated (for each application) in a manner known to workers in this art. A law dispersion plastic is preferred for plate 27.

While the optic axis of objective lens 14 has been shown in FIG. 1 as coincident with the axis of the entrance face of fiber bundle 18, the reader will understand that these axes may be non-coincident. By the use of mirrors, bending the fiber bundle 18, etc., greater compactness may be realized. It will also be noted that there may arise applications which require further magnification (or diminution) at the faces of termini 24. In such instances an additional lens may be provided each terminal 24, or, the plate 26 may be provided with integral lensettes on its right face (FIG. 2), with the termini 24 aligned, respectively, with them.

I claim:
1. A multiple function optical apparatus including,,
   (a) a bundle of internally reflecting coherent optic fibers, said bundle having a main, bunched end and being divided along the remainder of its length into sub-bundles, each sub-bundle itself also being coherent, the termini of the sub-bundles diverging from and spaced from each other and positioned on and defining a surface, each sub-bundle being twisted 180 degrees along its length, each sub-bundle adapted to carry a sub-image which is less than an entire image on the end of the main bundle in one mode of operation,
   (b) a screen spaced from said sub-bundle termini, said screen being parallel to the termini surface,
   (c) a microfiche having a photographis emulsion on one side and a plurality of integral lensettes on the other side,
   (d) said microfiche positioned between the termini of said sub-bundles and said screen,
   (e) each output terminal of each sub-bundle being contiguous to said emulsion, said emulsion side of said microfiche facing said sub-bundle termini, each terminal of each sub-bundle being optically aligned with a lensette, the number of lensettes being greater than the number of sub-bundles.
2. The apparatus of claim 1 including,
   (a) a plurality of opaque septa between said microfiche lensettes and said viewing screen surface, said septa dividing the microfiche-viewing screen space into cells each closed on its sides, there being a unique sub-bundle terminal for each cell, each cell being open at its ends and axially aligned with a sub-bundle terminal.
3. The apparatus of claim 1 including a mask having a plurality of openings carried by the side of the viewing screen facing said termini, there being one opening aligned with each sub-bundle terminal.
4. A multiple function optical apparatus including,
   (a) means to optically disperse an image of an object to thereby yield sub-image of the object, said sub-images being located at dispersed regions of a surface,

(b) a transparent plate having a plurality of integral lensettes, said transparent plate being a microfiche having a photographic emulsion on one side and the integral lensettes on the other side, and wherein said surface is contiguous to said emulsion, said emulsion side of said microfiche facing said surface, the location of each sub-image being optically aligned with a lensette.

5. The apparatus of claim 4 including,
(a) a plate carrying a plurality of nodules on one side thereof, said nodules being transparent, said plate positioned between said sub-image surface and said emulsion, each nodule having a plurality of faces, at least some faces having primary color filters thereon; the center of each nodule being aligned with a respective sub-image location,
(b) each face of each nodule being optically aligned with a corresponding lensette.

6. The apparatus of claim 4 including,
(a) at least two primary color filters and one clear filter, thus defining a filter set, each filter set contiguous to a sub-image location on said surface,
(b) said clear filter of each filter set being optically aligned with a sub-image location,
(c) each color filter optically aligned with a lensette.

7. The apparatus of claim 6 wherein said sub-image locations on said surface are spaced from said emulsion, to thereby permit light from said sub-images to disperse and thereby illuminate a plurality of micro-image zones carried by the emulsion.

8. The apparatus of claim 7 wherein said means to optically disperse an image of an object is defined by a bundle of internally reflecting coherent optic fibers, said bundle having a main, bunched end and being divided along the remainder of its length into sub-bundles, each sub-bundle itself also being coherent, the termini of the sub-bundles diverging from and spaced from each other and positioned on a surface, each sub-bundle being twisted 180° along its length, each sub-bundle adapted to carry a sub-image which is less thn an entire image on the end of the main bundle in one mode of operation, and also including a transparent sheet spacing said termini from said emulsion, said sheet having protuberances each aligned with a sub-bundle terminal, the protuberances causing light from said termini to diverge.

9. The apparatus of claim 6 wherein said means to optically disperse an image of an object is defined by a bundle of internally reflecting coherent optic fibers, said bundle having a main, bunched end and being divided along the remainder of its length into sub-bundles, each sub-bundle itself also being coherent, the termini of the sub-bundles diverging from and spaced from each other and positioned on a surface, each sub-bundle being twisted 180° along its length, each sub-bundle adapted to carry a sub-image which is less than an entire image on the end of the main bundle in one mode of operation, and also including a mirror parallel to and spaced from said microfiche, each sub-image location on said surface, each output terminal of each sub-image being contiguous to said emulsion, whereby white light from the termini passes through the clear filter and forms a real image on the mirror for the color filters.

10. The apparatus of claim 6 wherein said color filter sets are located in a plane parallel to said lensettes.

11. The apparatus of claim 6 wherein said color filter sets are defined by color films on said lensettes, the said clear filter of each color set defined by an uncoated lensette.

12. A multiple function optical apparatus including,
(a) a bundle of internally reflecting coherent optic fibers, said bundle having a main, bunched end and being divided along the remainder of its length into sub-bundles, each sub-bundle itself also being coherent, the termini of the sub-bundles diverging from and spaced from each other and positioned on a surface, each sub-bundle being twisted 180 degrees along its length, each sub-bundle adapted to carry a sub-image which is less than an entire image on the end of the main bundle in one mode of operation,
(b) a screen spaced from said sub-bundle termini, said screen being parallel to the termini surface,
(c) a microfiche having a photographis emulsion on one side and a plurality of integral lensettes on the other side,
(d) said microfiche positioned between the termini of said sub-bundles and said screen,
(e) each output terminal of each sub-bundle being contiguous to said emulsion, each emulsion side of said microfiche facing said sub-bundle termini, each terminal of each sub-bundle being optically aligned with a lensette, the number of lensettes being greater than the number of sub-bundles,
(f) one set of emulsion areas corresponding to one set of lensettes being transparent.

* * * * *